United States Patent
McGushion

(10) Patent No.: US 7,335,853 B2
(45) Date of Patent: Feb. 26, 2008

(54) METHOD FOR ORBITAL WELDING USING A PULSED CURRENT

(76) Inventor: Kevin McGushion, 1448 19th St., Santa Monica, CA (US) 90404

(*) Notice: Subject to any disclaimer, the term of this patent is extended or adjusted under 35 U.S.C. 154(b) by 132 days.

(21) Appl. No.: 11/388,701

(22) Filed: Mar. 24, 2006

(65) Prior Publication Data
US 2006/0213893 A1     Sep. 28, 2006

Related U.S. Application Data

(60) Provisional application No. 60/665,410, filed on Mar. 25, 2005.

(51) Int. Cl.
B23K 9/09    (2006.01)

(52) U.S. Cl. ............................. 219/137 PS; 219/60 A; 219/130.51

(58) Field of Classification Search .............. 219/60 A, 219/60 R, 61, 125.11, 130.51, 137 PS
See application file for complete search history.

(56) References Cited

U.S. PATENT DOCUMENTS 5,571,431 A * 11/1996 Lantieri et al. ............ 219/60 A

FOREIGN PATENT DOCUMENTS

JP    8-243744 A  *  9/1996

* cited by examiner

Primary Examiner—Clifford C. Shaw
(74) Attorney, Agent, or Firm—Aaron McGushion

(57) ABSTRACT

A method for the orbital welding of tubular elements held in abutment comprising the steps of striking an arc at a strike point with an orbital welder between an electrode and a seam formed by a first tubular element and a second tubular element, held in abutment within a fixture; initiating an orbit of said electrode around an abutment of said first tubular element and said second tubular element; adjusting the current of said arc in a pulsed manner from a maximum current to a minimum current at a set frequency, combination of said maximum current and said minimum current forming an average current; decreasing said average current in a generally continuous manner as said orbit of said electrode progresses from said strike point, the rate of decrease of said maximum current having a generally inverse relationship to the rate of increase in temperature experienced by said tubular elements.

6 Claims, 3 Drawing Sheets

METHOD FOR ORBITAL WELDING USING A PULSED CURRENT

CROSS-REFERENCE TO RELATED APPLICATIONS

This application is entitled to the benefit of Provisional Application for Patent Ser. No. 60/665,410 filed on Mar. 25, 2005.

BACKGROUND OF THE INVENTION

This invention relates to a method for welding metal tubes and components. More particularly, the present invention relates to a method of affecting the weld bead geometry by continuously decreasing the average pulsed electric current supplied to an orbital welding device during the welding process, to compensate for the temperature increase experienced in the metal components.

When butt welding together two metal components with tubular extensions, using an orbital welding device, such as the device disclosed in U.S. Pat. No. 5,196,664 to McGushion (1993), it is generally a desired result to create a weld bead which completely penetrates the walls of the tubular extensions, has a weld bead which fully covers the inner diameter and outer diameter seam formed between the two tubular components, and joins together the complete wall cross sectional areas of the same tubular extensions, while maintaining a consistent weld bead geometry.

During the welding process using a constant average current, the average temperature of the components being welded tends to rise due to the thermal energy introduced by the welding device. As the orbital welding device orbits the seam between the components being welded, melting the parent material, the thermal energy is stored in the components as internal energy; while additional thermal energy is added as the remainder of the seam is welded, again still increasing the average component temperature. If the current is not decreased, a surplus of internal energy will accumulate, increasing weld bead and adjacent area temperature to an unacceptable level, causing additional parent material to melt. The weld bead, as a result, will increases to an unacceptable width in some areas, possibly collapsing or rupturing, while possibly being under penetrated in other areas. Therefore, if a constant current is applied to an orbital weld, it is likely that the components will overheat, causing the weld bead to be enlarged to an unacceptable point.

One method currently being used to address the problem of overheating induced irregular weld beads, involves reducing the electric current being provided to the welding device, in a step function manner, throughout the welding process. Usually, when using this single orbit current step reduction method, the orbital welding device's electrode completes at least one welding orbit around the tubular components, but less than two complete welding orbits. The total time required to complete a weld is divided into any number of sectors. Although the time can be divided into numerous sectors, in the example presented the total time will be divided into five sectors.

The first full orbit around the tube is divided into four, generally equal, sectors; and the fifth sector of the weld overlaps and travels beyond the weld start point while the current provided to the electrode is gradually reduced to zero or close to zero. The five sectors generally complete more than one and less than two complete welding orbits.

In the first sector (beginning at the weld start point), the electric arc is first applied to the tubes being welded. After the arc is applied, the electrode will generally remain stationary at this starting point until the walls of the tubes, at that point, are molten from the outer wall surface to the inner wall surface. Then, the electrode will start its rotation through sector one, fusing the tubes in its wake. The average temperature of the tubes will begin to increase, generally in a near linear manner, as soon as the welding process begins. To prevent overheating in section two, due to the heat applied to section one, the current is reduced in a step-like manner when entering sector two.

Even though the current is being reduced, the average temperature of the tubes still increases. To prevent overheating in sector three, due to the heat applied to sectors one and two, the current is again reduced in a step-like manner when entering sector three.

Likewise, to prevent overheating in sector four, due to the heat applied to sectors one, two, and three, the current is once again reduced in a step-like manner when entering sector four. Finally, when the electrode has made one complete weld rotation, past the start point and into sector five, the current level is gradually tapered down to approximately zero in the down slope stage, creating a weld bead width that also tapers to a point.

One of the primary disadvantages of the single orbit current step reduction method is that it is, quite often, a difficult and time consuming process to program an effective weld schedule for the electronic controlling means of the orbital welding device. The welding practitioner must produce numerous, possibly hundreds, of test welds to find the weld schedule which produces the most desirable weld bead. Each test weld bead is inspected for areas of overheating (where the weld bead is too wide) and areas of under-heating (where the weld bead is too narrow or does not fully penetrate the walls of the tubes). After the inspection, the welding practitioner must hypothesize, generally from experience, on which sections it is necessary to increase the current, which sections it is necessary to decrease the current, or if anything at all should be adjusted.

Because, from mere observation, it is not always predictable how exactly the heat generation in any one section relates to a temperature rise in the other sections, it is difficult for the practitioner to calculate which sections need current adjustment in order to effect the geometry of the weld bead in another section. For example, a current adjustment in one section might be programmed to correct a problematic weld bead geometry in another section observed after a test weld; and the following test weld could reveal that the weld bead in the previously problematic section has been corrected, but the weld bead geometry in another previously unaffected section has been negatively affected by the adjustment. A welding practitioner may spend many hours repeatedly correcting the weld bead geometry in one section, only to find that the weld bead geometry in another section has been adversely affected. This long cycle of repetitive correcting becomes even more complicated if the weld schedule is divided in to yet more sections.

Another disadvantage of the current step reduction method is an inconsistent weld bead. At each point that an instantaneous reduction in electric current is programmed, there can be seen on the weld bead of the tubes a corresponding point of immediate weld bead width reduction. As the observer rotates the tubular component to view the entire weld area, the weld bead width appears to start from a minimum width; and steadily increases in width until the point at which the current is stepped down. At the instantaneous current reduction point, the weld bead width is immediately reduced, forming a corner, potentially a stress riser. This weld bead width growth and reduction pattern repeats for every step down reduction in the welding current. This undesirable effect can be reduced by increasing the number of current reduction steps in a given weld schedule. However, increasing the number of current reduction steps significantly complicates the task of programming a suitable weld schedule. Another even longer cycle of repetitive correcting would be necessary.

Yet, another method that is used to attempt a solution to the problem of overheating induced irregular weld beads is the multiple orbit constant current method. Instead of pausing the electrode when the weld first begins, to allow the weld bead to fully penetrate the walls of the tubes (as in the single orbit current step reduction method), the electrode immediately begins to orbit the tubes as soon as an electric arc between the electrode and tubes is established.

As the average temperature of the tubes and their heat energy both increase during the welding process, the molten weld bead penetrates progressively, in a spiral-like fashion, deeper into the walls of the tubes. The first orbit alone will generally not produce a weld bead that has fully penetrated the complete inner seam between the tubes. Therefore, more than one, but usually more than two, orbits by the electrode is required. In one sample weld, as the electrode begins its second welding orbit, the stored heat energy in the tubes allows the molten weld bead to fully penetrate the walls of the tubes in approximately the first quadrant of the second orbit.

The electrode then continues in its second orbit into further sections of the orbit that are more fully penetrated (a result of the first orbit) than the first section. Because the current is constant, there is no way to prevent overheating in these areas of more complete penetration. It is possible that the resulting weld bead characteristics in the first approximate quadrant are acceptable, but the overheated areas would be characterized by an undesirably large, over-penetrated weld bead. Because it is a desired result to produce a weld bead with constant penetration and geometrical characteristics, the multiple orbit constant current method is not usually the best option.

Accordingly, there is a need for a method to easily produce a weld bead with desirable constant penetration and geometrical characteristics, without the need for an overly complicated weld schedule and unnecessarily lengthy test welds.

SUMMARY OF THE INVENTION

The present invention provides a pulsed current adjustment method for the joining of two tubular components using an orbital welding device, comprising the steps of:

striking an arc with an orbital welder between the electrode and a first and second tubular component, held in abutment within a fixture;

initiating an orbit of the electrode around the abutment of the tubular components;

adjusting the current of the arc in a pulsed manner from a maximum current to a minimum current at a set frequency;

decreasing the maximum current in a generally continuous manner as the orbit of the electrode progresses from the strike point, the rate of decrease having a generally inverse relationship to the rate of increase in temperature experienced by the tubular components;

wherein the average current is generally decreasing continuously;

and wherein the minimum current is held generally constant;

and wherein the average temperature of the components is maintained within a predetermined range;

and wherein the resulting weld bead is fully penetrated through the walls of the first and second tubular components and generally constant in width.

The method described above enables the creation of predictable weld beads, of consistent penetration and width, for known tubular components. For each material and heat transfer characteristics available for tubular component manufacturing, there is an ideal temperature required to achieve the required weld bead. The current provided to the orbital welder is driven by the ideal temperature, as the temperature increases, the current is reduced accordingly, to maintain the specified ideal temperature band. The temperature can be measured in various areas including the molten weld bead itself, an area adjacent to the weld bead, or an item contiguous to one of the tubular components. The temperature can be measured by various means including a thermocouple, laser sensor, and the like.

Additionally, if the thermal characteristics of a component is known, where the relationship between temperature and current given a welding condition are known either experimentally or theoretically, temperature monitoring during a weld may not be necessary. The rate of continuous current reduction can be predetermined, and automatically set, if the two components being welded are known.

An alternate embodiment of the present invention further provides a pulsed current adjustment method for the joining of two tubular components using an orbital welding device, comprising the steps of:

striking an arc with an orbital welder between the electrode and a first and second tubular component, held in abutment within a fixture;

initiating an orbit of the electrode around the abutment of the tubular components;

adjusting the current of the arc in a pulsed manner from a maximum current to a minimum current at a set frequency;

decreasing the maximum current in a generally continuous manner as the orbit of the electrode progresses from the strike point, the rate of decrease having a generally inverse relationship to the rate of increase in temperature experienced by the tubular components;

decreasing the minimum current in a generally continuous manner as the orbit of the electrode progresses from the strike point, the rate of decrease having a generally inverse relationship to the rate of increase in temperature experienced by the tubular components;

wherein the average current is generally decreasing continuously;

and wherein the average temperature of the components is maintained within a predetermined range;

and wherein the resulting weld bead is fully penetrated through the walls of the first and second tubular components and generally constant in width.

The average current, in either method is reduced continuously throughout the welding process. Depending on the circumstances and the welding power supply used, reducing both the maximum and minimum current levels simultaneously can be beneficial.

An additional alternate embodiment includes a rapid decrease in current, starting at the conclusion of at least the first orbit, comprising the steps of:

striking an arc with an orbital welder between the electrode and a first and second tubular component, held in abutment within a fixture;

initiating an orbit of the electrode around the abutment of the tubular components;

adjusting the current of the arc in a pulsed manner from a maximum current to a minimum current at a set frequency;

decreasing the maximum current in a generally continuous manner as the orbit of the electrode progresses from the strike point, the rate of decrease having a generally inverse relationship to the rate of increase in temperature experienced by the tubular components;

decreasing rapidly the average current in a generally continuous manner at the conclusion of at least the first orbit of the electrode around the tubular components;

wherein the average current is generally decreasing continuously;

and wherein the minimum current is held generally constant;

and wherein the average temperature of the components is maintained within a predetermined range;

and wherein the resulting weld bead gradually tapers as the bead overlaps the start point;

and wherein the resulting weld bead is fully penetrated through the walls of the first and second tubular components and generally constant in width.

This rapid decrease in current after the conclusion of at least one orbit around the tubular components allows for a smooth transition out of a weld. Instead of an abrupt end to the weld, possibly causing weld failure, the weld bead is gradually reduced in width, overlapping the start of the weld, and tapering to point where the arc can be smoothly disengaged.

BRIEF DESCRIPTION OF THE DRAWINGS

FIG. 3a is a graphical representation of electric current supplied to the orbital welding device verses time.

FIG. 3b is a graphical representation of the temperature experienced by the component during the welding process verses time.

FIG. 3c is a view of the final weld bead geometry placed on a graph that compares the weld bead width with the circumference of the tubular components being welded.

FIG. 4a is a graphical representation of electric current supplied to the orbital welding device verses time.

FIG. 4b is a graphical representation of the temperature experienced by the component during the welding process verses time.

FIG. 4c is a view of the final weld bead geometry placed on a graph that compares the weld bead width with the circumference of the tubular components being welded.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

In accordance with the present invention, a pulsed current adjustment method for orbital welding is provided. The present invention achieves a weld bead structure with desirable constant penetration and geometrical characteristics. Moreover, the method achieves an effective and simple weld schedule, without the need for unnecessarily lengthy testing of the weld schedule or program.

Figure 1:
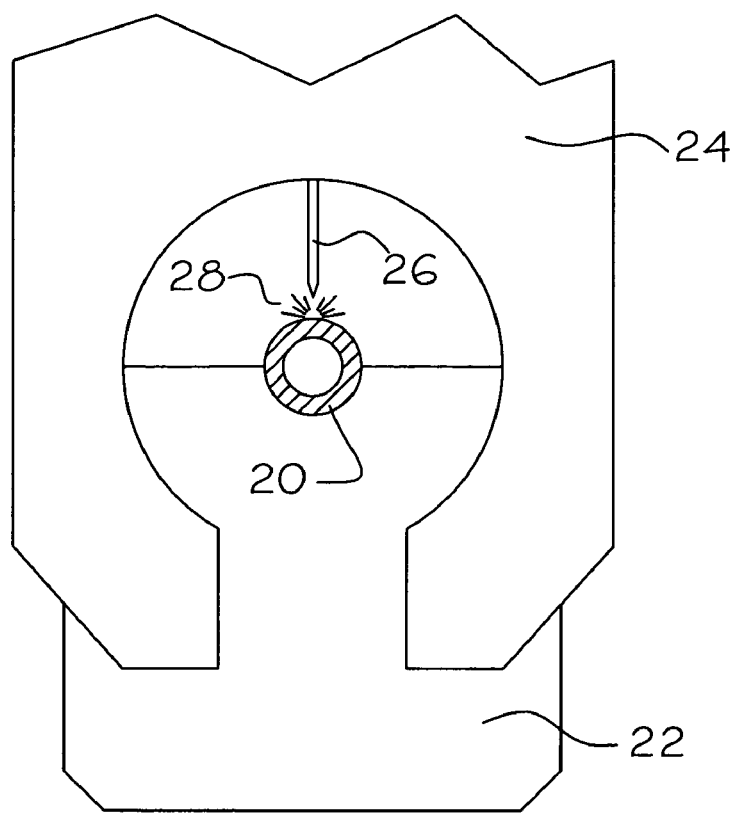
FIG. 1 is a side view of a welding device, fixture, and tubular components in a welding configuration.
Figure 2:
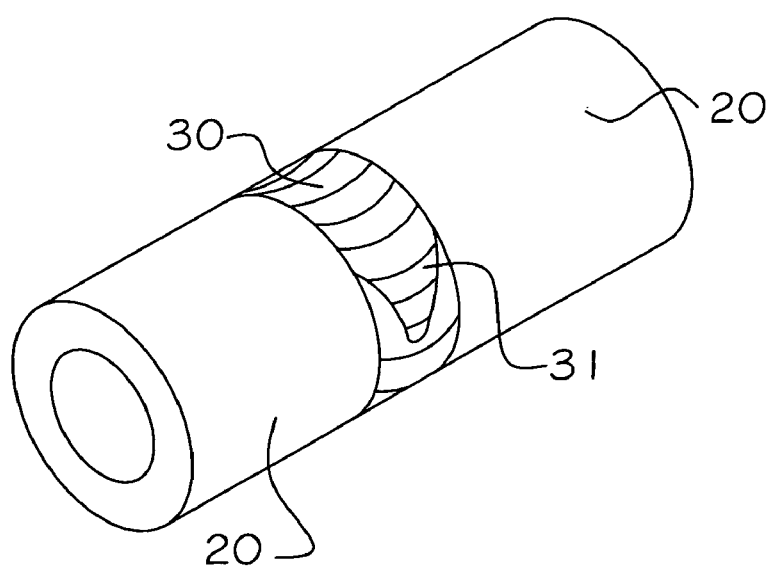
FIG. 2 is a perspective view of a desired weld bead geometry.

To achieve these and other advantages and in accordance with the purpose of the invention, as embodied and broadly described herein, the invention provides a method for producing geometrically desirable weld beads (30) when butt welding together tubular components (20) held in a fixture (22) with an orbital welder (24), as can be seen in FIG. 1. Looking at FIG. 2, a resulting weld bead (30), joining the two tubular components (20). It can be seen that the weld bead (30) has a consistent width, with no sudden changes or stress risers.

In the method according to this invention, the average pulsed electric current supplied by the orbital welder (24), through the electrode (26), is decreased generally continuously linearly or curvilinearly, per unit time, in relation to the temperature increase experienced by the metal tubular components (20) being welded.

Figure 3A:
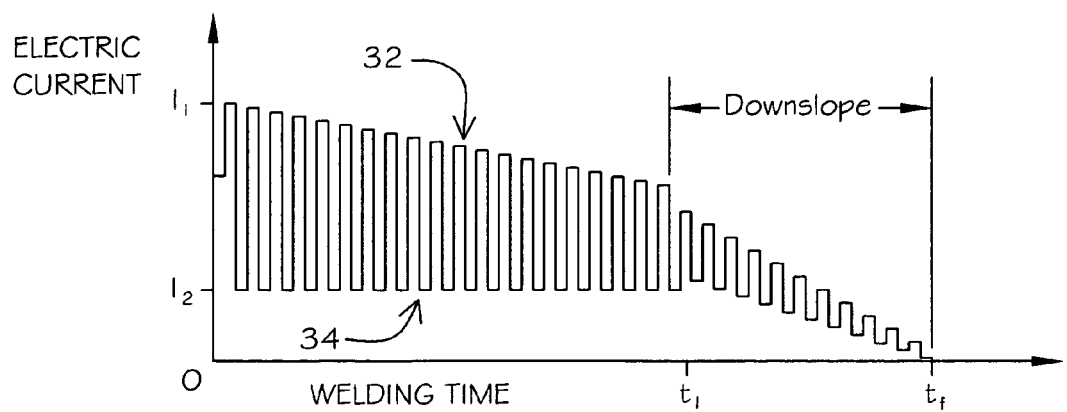
FIGS. 3a-c are graphical representations of the process according to the invention.

The measured temperature of these tubular components (20) generally increases in a nearly linear manner during the welding process; therefore, the current reduction rate employed by this method decreases in a general linear or curvilinear manner in response to the temperature increase, so as to maintain a desirable constant weld bead (30) geometry. As seen in FIG. 3a, this method utilizes a pulsed electric current, fluctuating at a frequency between a maximum current (32) and minimum current (34), generally decreasing the maximum current (32) while maintaining the minimum current (34).

Figure 3B:
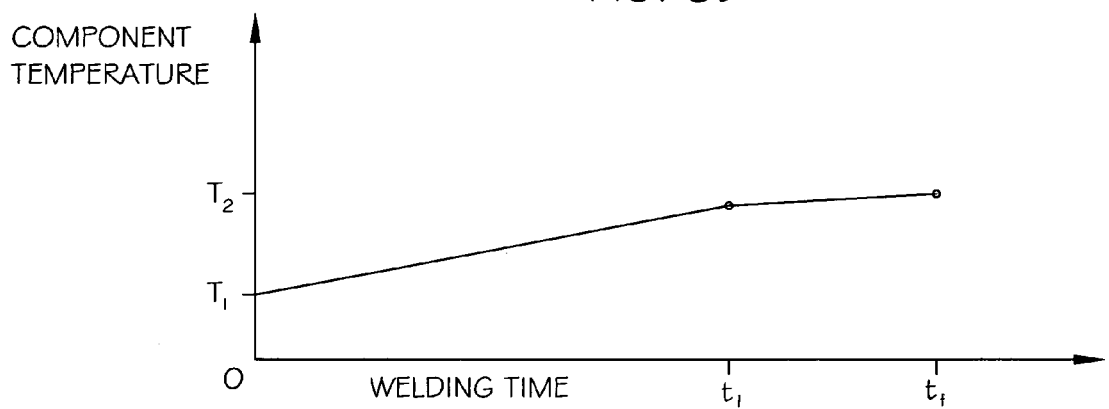
Figure 3C:
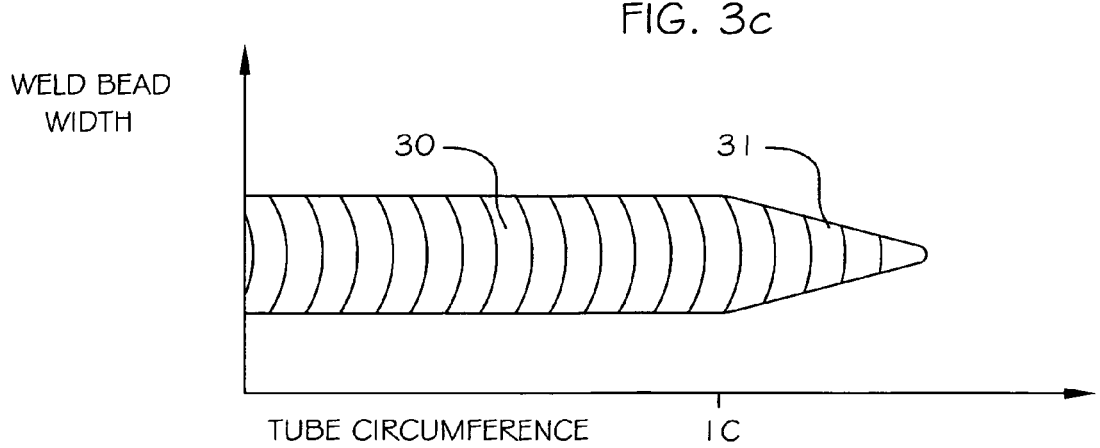

More specifically, in a preferred embodiment, a linearly decreasing average current method is utilized to weld two tubular components (20) together. An arc (28) is initiated; and as the weld progresses, and the stored internal energy, and accordingly the temperature, both increase, the maximum current (32) will be steadily reduced in order to maintain the predetermined temperature required for an acceptable weld bead (30), as seen in FIGS. 3a-c. When the electrode (26) makes at least one complete orbit in the welding process, the electric current supplied to the orbital welder (24) is decreased at an even faster rate in a down slope stage. This increased current rate reduction is initiated at this point to allow the weld bead (30) width to gently reduce to a taper (31) until the average electric current is reduced to zero, and the weld is disengaged.

The linearly decreasing average current method allows the welding practitioner to produce a weld bead (30) with a desirably constant geometry, without the stress risers produced by previous methods. Additionally, when the relationship between the rate of change of temperature, shown in FIG. 3b, of the tubular components (20) being welded and the rate of change of the electric current supplied to the orbital welder (24) is known, it is a quick and simple matter to develop an effective weld schedule, without the need for numerous test welds.

FIG. 3c shows a desired weld bead, as if it were laid out flat. The weld bead (30) width is constant for at least one rotation about the tubular component (20) circumference. Then the weld bead (30) width is gently reduced to a taper (31).

Figure 4A:
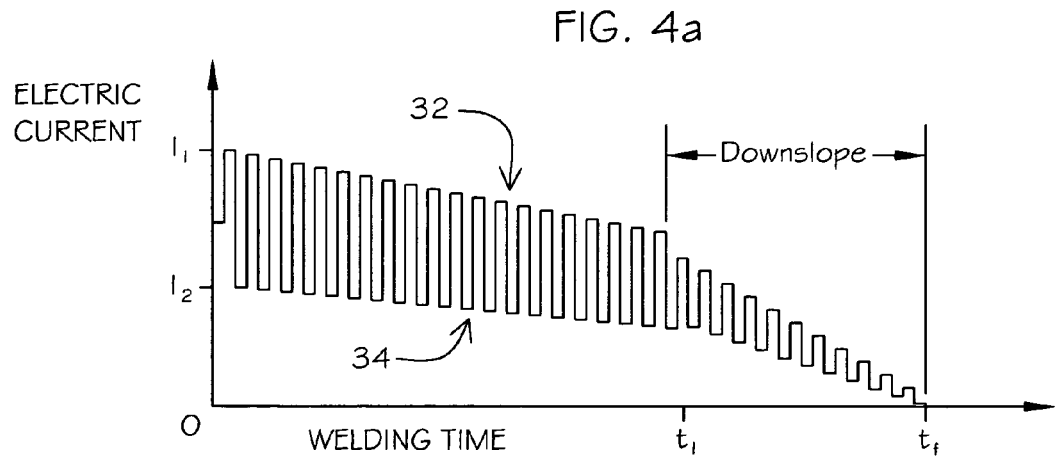
FIGS. 4a-c are graphical representations of the process according to an alternate embodiment of the present invention.
Figure 4B:
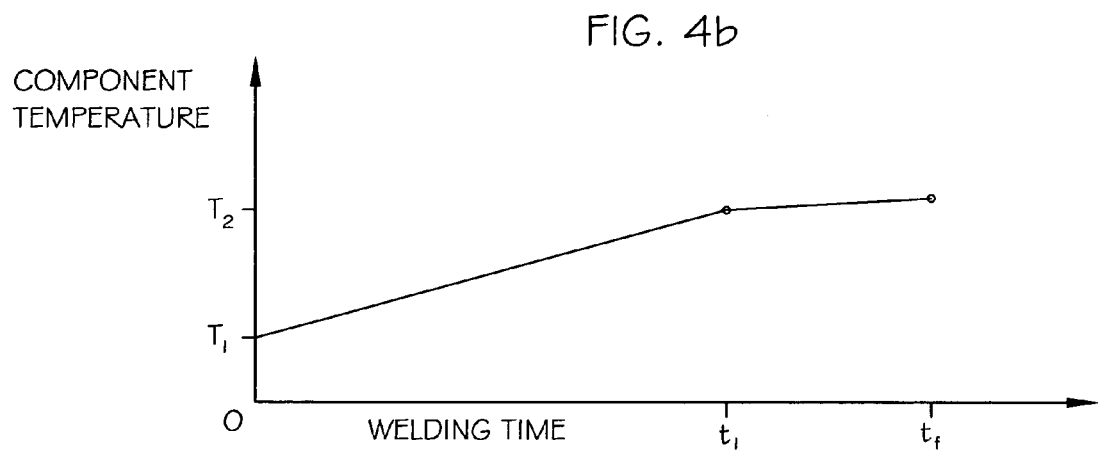
Figure 4C:
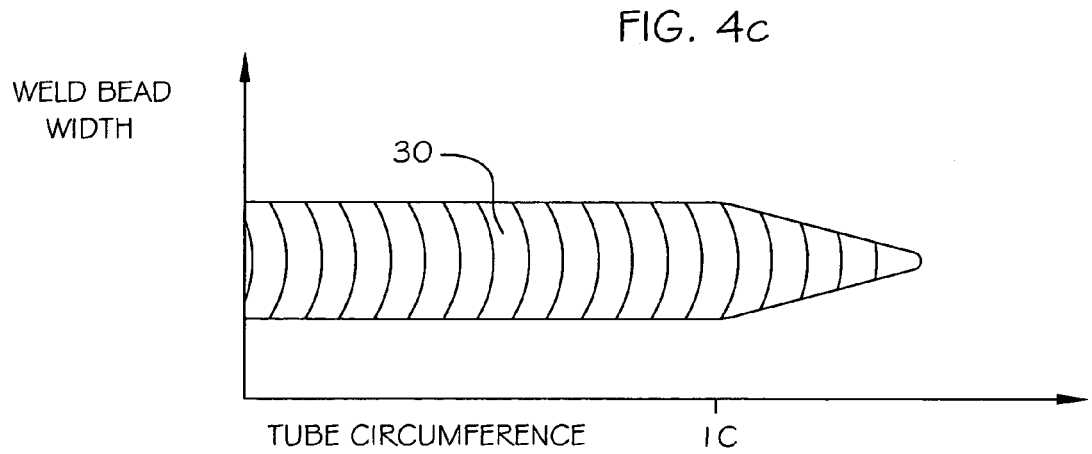

In an alternate embodiment, as shown in FIGS. 4a-c, the maximum current (32) and minimum current (34) are simultaneously adjusted, to obtain a generally continuously decreasing average current. Any number of combinations between the maximum current (32) and minimum current (34) can be programmed, insofar as the average current is generally decreasing continuously with time. For instance, the value of the maximum current (32) can be generally decreasing, while the value of the minimum current (34) can be generally increasing, the current slopes generally converging, and the average current is generally decreasing over a period of time. In another scenario, both the maximum current (32) and minimum current (34) can be generally decreasing, at similar or dissimilar rates. As stated, many combinations of values for the maximum current (32) and minimum current (34) can be established with the result of a generally decreasing average current value.

The linearly decreasing average current methods described can be integrated into many of the current welding methods used in industry. The prior art methods described in the background can both be improved significantly by employing the linearly decreasing average current methods.

The disadvantages of the constant current and the stepped current methods are eliminated with the implementation of the present invention. Because of the continuous reduction of the average pulsed current, stress risers and irregularly shaped welds are avoided. It is possible to produce welds that predictably meet or exceed industry standards, having complete penetration, consistent bead width, and consistent penetration.

While the present invention has been described with regards to particular embodiments, it is recognized that additional variations of the present invention may be devised without departing from the inventive concept.

Having thus described the invention, it is now claimed:

1. A method for the orbital welding of tubular elements held in abutment comprising the steps of:
   a) striking an arc at a strike point with an orbital welder between an electrode and a seam formed by a first tubular element and a second tubular element held in abutment within a fixture, said first tubular element having a wall, said second tubular element having a wall;
   b) initiating an orbit of said electrode around an abutment of said first tubular element and said second tubular element;
   c) adjusting the current of said arc in a pulsed manner from a maximum current to a minimum current at a set frequency;
   d) decreasing said maximum current in a generally continuous manner as said orbit of said electrode progresses from said strike point, the rate of decrease of said maximum current having a generally inverse relationship to the rate of increase in temperature experienced by said tubular elements;

wherein an average current is generally decreasing continuously over time;
   and wherein said minimum current is held generally constant;
   and wherein an average temperature of said tubular elements is maintained within a predetermined range;
   and wherein a resulting weld bead is fully penetrated through said walls of said first tubular element and said second tubular element.

2. The method of claim 1 further comprising the steps of:
   decreasing rapidly said average current in a generally continuous manner at the conclusion of at least a first orbit of said electrode around said seam formed between said first tubular element and said second tubular element;
   disengaging said arc.

3. A method for the orbital welding of tubular elements held in abutment comprising the steps of:
   a) striking an arc at a strike point with an orbital welder between an electrode and a seam formed by a first tubular element and a second tubular element, held in abutment within a fixture, said first tubular element having a wall, said second tubular element having a wall;
   b) initiating an orbit of said electrode around an abutment of said first tubular element and said second tubular element;
   c) adjusting the current of said arc in a pulsed manner from a maximum current to a minimum current at a set frequency;
   d) decreasing said maximum current in a generally continuous manner as said orbit of said electrode progresses from said strike point, the rate of decrease of said maximum current having a generally inverse relationship to the rate of increase in temperature experienced by said tubular elements;
   e) decreasing said minimum current in a generally continuous manner as said orbit of said electrode progresses from said strike point, the rate of decrease of said maximum current having a generally inverse relationship to the rate of increase in temperature experienced by said tubular elements;

wherein an average current is generally decreasing continuously over time;
   and wherein said minimum current is held generally constant;
   and wherein an average temperature of said tubular elements is maintained within a predetermined range;
   and wherein a resulting weld bead is fully penetrated through said walls of said first tubular element and said second tubular element.

4. The method of claim 3 further comprising the steps of:
   decreasing rapidly said average current in a generally continuous manner at the conclusion of at least a first orbit of said electrode around said seam formed between said first tubular element and said second tubular element;
   disengaging said arc.

5. A method for the orbital welding of tubular elements held in abutment comprising the steps of:
   a) striking an arc at a strike point with an orbital welder between an electrode and a seam formed by a first tubular element and a second tubular element, held in abutment within a fixture, said first tubular element having a wall, said second tubular element having a wall;

b) initiating an orbit of said electrode around an abutment of said first tubular element and said second tubular element;

c) adjusting the current of said arc in a pulsed manner from a maximum current to a minimum current at a set frequency, combination of said maximum current and said minimum current forming an average current;

d) decreasing said average current in a generally continuous manner as said orbit of said electrode progresses from said strike point, the rate of decrease of said maximum current having a generally inverse relationship to the rate of increase in temperature experienced by said tubular elements;

wherein an average temperature of said tubular elements is maintained within a predetermined range;

and wherein a resulting weld bead is fully penetrated through said walls of said first tubular element and said second tubular element.

6. The method of claim 5 further comprising the steps of:

decreasing rapidly said average current in a generally continuous manner at the conclusion of at least a first orbit of said electrode around said seam formed between said first tubular element and said second tubular element;

disengaging said arc.

* * * * *